United States Patent [19]

Perr

[11] Patent Number: 5,029,568
[45] Date of Patent: Jul. 9, 1991

[54] INJECTION RATE CONTROL INJECTOR

[75] Inventor: Julius P. Perr, Columbus, Ind.

[73] Assignee: Cummins Engine Company, Inc., Columbus, Ind.

[21] Appl. No.: 463,304

[22] Filed: Jan. 10, 1990

[51] Int. Cl.$^5$ .................... F02M 45/12; F02M 59/34
[52] U.S. Cl. .................... 123/447; 123/496; 123/506; 239/88; 239/124
[58] Field of Search ............... 123/446, 447, 506, 496; 239/88, 89, 95, 124

[56] References Cited

U.S. PATENT DOCUMENTS

| | | | |
|---|---|---|---|
| 3,544,008 | 12/1970 | Reiners et al. | 239/90 |
| 3,557,765 | 1/1971 | Hystrom | 123/387 |
| 3,677,256 | 7/1972 | Regneault et al. | 123/506 X |
| 3,718,283 | 2/1973 | Fenne | 239/533.4 |
| 3,747,857 | 7/1973 | Fenne | 239/90 |
| 3,965,875 | 6/1976 | Perr | 123/496 |
| 4,029,071 | 6/1977 | Saito et al. | 123/496 X |
| 4,091,771 | 5/1978 | Rapp et al. | 123/447 X |
| 4,129,253 | 12/1978 | Bader, Jr. et al. | 239/124 X |
| 4,129,256 | 12/1978 | Bader, Jr. et al. | 123/506 X |
| 4,469,068 | 9/1984 | Kuroyanagi et al. | 123/506 X |
| 4,718,384 | 1/1988 | Takahashi | 123/496 X |
| 4,811,715 | 3/1989 | Djordjevic et al. | 123/506 X |

Primary Examiner—Tony M. Argenbright
Attorney, Agent, or Firm—Sixbey, Friedman, Leedom & Ferguson

[57] ABSTRACT

A unit fuel injector for a fuel injection system for an internal combustion engine is described that is reciprocably driven from a camshaft by a drive train, and the unit injector includes a device for controlling the rate of fuel injection into an engine cylinder. The rate control device operates to divert or bleed off a quantity of fuel from the main metering chamber of an open-nozzle type fuel injector during an initial phase of injection, and the diverted fuel is returned to the metering chamber at a later phase in the injector operation. The rate control device includes an auxiliary metering chamber which receives the diverted fuel via an auxiliary passageway. An auxiliary plunger is mounted within the auxiliary metering chamber. A biasing device such as a helical spring or a fluid pressure spring, controls the inward and outward movement of the auxiliary plunger. The biasing device causes the auxiliary plunger to return the diverted fuel to the metering chamber when the pressure of the auxiliary plunger biasing device exceeds the fluid pressure within the metering chamber. In one embodiment, the biasing device is adjustable by controlling a control pressure of a fluid pressure spring.

23 Claims, 6 Drawing Sheets

INJECTION RATE CONTROL INJECTOR

TECHNICAL FIELD

The present invention is directed to a fuel injector train having a variable injection rate. More particularly, the present invention is directed to a fuel injector train having an auxiliary fuel chamber to receive a diverted quantity of fuel therein with a biased piston therein to vary the injection rate.

BACKGROUND OF THE INVENTION

Internal combustion engine designers have increasingly come to realize that substantially improved fuel supply systems are required in order to obtain higher levels of pollution abatement and increased fuel economy. Among the known options, direct fuel injection improves performance but higher initial costs have tended to discourage its general adoption. Additionally, only the more sophisticated and more expensive direct injection systems are capable of achieving the increasingly higher performance goals of engine manufacturers.

Early fuel injection systems centered on distributor type fuel injection systems having a single centralized high pressure pump and a distributor valve for metering and timing fuel flow from the pump to each of a plurality of injection nozzles, such as disclosed in U.S. Pat. No. 3,557,765. Although simple in design concept, these systems generally suffer defects inherent with separation of the injector nozzles from the centralized pump. Unit injector systems avoid these inherent defects by providing each engine cylinder with its own cam-actuated pump such as disclosed in U.S. No. 3,544,008. However, except for heavy duty compression ignition engine applications, the performance advantage of unit injectors has generally not outweighed the detriment of greater costs. The design of a commercially competitive unit fuel injector therefore normally involves acceptance of some characteristics which are less than optimal since the basic goals of low cost, high performance, and reliability are often in direct conflict.

One method of improving the performance characteristics of unit fuel injectors at relatively low cost is to vary the injection rate. A recent method for varying the injection rate is disclosed in commonly owned U.S. Pat. No. 3,965,875 entitled "Fuel Injection System for Diesel Engines," which discloses a fuel injector in which fuel is injected at a relatively slow rate during a first phase of the injector plunger injection stroke and then is injected at a faster rate during a second phase of the injector plunger injection stroke. During the initial phase of injection, the injection rate is slower, due to the compression of an auxiliary spring mounted around a rod which is received within and reciprocates the injection plunger. The auxiliary spring reduces the overall spring rate of the drive train and slows the inward movement of the plunger for a predetermined compression, after which fuel is injected at a faster rate.

Fenne, U.S. Pat. No. 3,718,283, discloses a fuel injection system including a coaxial spring biased valve which allows a substantially unrestricted flow of fuel from a fuel pump through orifices for fuel injection following an initial period of restricted flow. The restricted flow and unrestricted flow are defined by the distance between the valve and its seat adjacent the orifices as controlled by fuel pressure acting on the combination of springs.

Another patent to Fenne, U.S. Pat. No. 3,747,857, discloses a fuel injection system for restricting the initial flow of fuel through an injector orifice where fuel pressure is used to urge a valve away from its initial seated position of closing off the injection orifices to a first position permitting restricted flow and a second position further from the seat allowing greater or unrestricted flow. The fuel pressure acting on the valve to cause the two positions is controlled by a relief valve and a spring biased piston within a chamber, wherein the piston moves against the spring during the initial restricted flow until the piston movement is stopped causing the fuel pressure acting on the valve to increase and to move the valve to a position of unrestricted flow.

Although the systems discussed above create different stages of injection, further improvement is desirable. None of these patents discloses a unit fuel injector that adequately simultaneously controls engine noise, nitric oxide emissions, and unburned hydrocarbons by controlling the rate of pressure rise.

SUMMARY OF THE INVENTION

It is an object of the present invention to provide a unit fuel injector that overcomes the deficiencies of the prior art by providing increased control over the rate of fuel injection in a fuel supply system for an internal combustion engine.

It is another object of the present invention to provide a unit fuel injector that controls the rate of fuel injection in an injection system using a rate control device that diverts or draws off fuel from the injection chamber to an auxiliary chamber of the unit fuel injector.

It is still another object of the present invention to provide a unit fuel injector with a rate control device that diverts fuel from the injection chamber at an initial phase of injection so as to reduce the injection rate at the initial phase.

Yet another object of the present invention is to provide a unit fuel injector with a rate control device that injects fuel at an initially restricted rate and at a rate as high as cam Hertz stress limitations allow after combustion begins, and that provides a sharp and clean end of injection.

It is a further object of the present invention to provide a unit fuel injector with a rate control device that variably controls the rate of fuel injection during the initial phase of injection.

It is another object to provide a unit fuel injector with a rate control device for controlling injection which includes an auxiliary chamber that receives diverted fuel during an initial portion of injection and a biased piston which returns fuel to the injection chamber during a subsequent portion of injector operation.

Still another object of the present invention is to provide a unit fuel injector with a rate control device that includes an auxiliary chamber disposed in the unit injector body adjacent the axial bore in which the injector plunger reciprocates during injector operation.

A further object of the present invention is to provide a unit fuel injector with a rate control device including an auxiliary metering chamber which receives fuel diverted from the axial bore in the injector housing, a restricted area passageway connecting the auxiliary metering chamber to the injection chamber, and a biased plunger disposed in the auxiliary metering chamber for controlling fuel flow into and out of the auxiliary metering chamber.

It is yet another object of the present invention to provide a unit fuel injector wherein less than 20 mm³ of fuel is injected during the first ten crank angle degrees of rotation during the injection cycle.

It is another object of the present invention to achieve the above objects while also decreasing engine noise, nitric oxide emissions, and the amount of unburned hydrocarbons.

These and other objects are attained by a unit fuel injector, according to the present invention, including an injector housing having an axial bore and a cam actuated plunger assembly mounted for reciprocal movement within the axial bore combined with a rate control device contained within the injector housing for bleeding off a portion of the fuel to be injected from a metering chamber of the axial bore during a first phase of the fuel injection of the injector cycle. The rate control device returns the portion of fuel to the metering chamber during a later phase of the injector cycle.

The rate control device includes an auxiliary metering chamber which receives that portion of the fuel which is diverted from the metering chamber of the axial bore. An auxiliary passageway is disposed in fluid communication between the axial bore and the auxiliary metering chamber, and an auxiliary plunger is disposed within the auxiliary metering chamber. an auxiliary plunger biasing device, which can be a helical spring, controls the movement of the auxiliary plunger. The auxiliary plunger biasing device causes the auxiliary plunger to return the portion of fuel bled from the metering chamber back to the metering chamber when the pressure of the auxiliary plunger biasing device exceeds the fluid pressure of the fuel acting on the auxiliary plunger from the auxiliary passageway.

In another embodiment, the rate control device is variable because the auxiliary plunger is biased by a fluid pressure spring that adjustably maintains a control pressure. The control pressure acts on the auxiliary plunger at the side opposite the fuel pressure to control the fuel flow into and out of the auxiliary chamber and the control pressure is adjustably set by way of an adjustable pressure regulating valve device which opens and closes depending on the control pressure and the pressure applied on the auxiliary plunger by the fuel diverted from the metering chamber within the auxiliary passageway.

The unit fuel injector according to the present invention provides increased control over the unit fuel injector rate and is designed to limit fuel injection to less than 20 mm³ of fuel per stroke during the first ten crank angle degrees of cam shaft rotation following initiation of injection. After the start of combustion, during the main injection phase of the injection cycle, the injection rate is as high as cam hertz stress allows, and the end of injection is sharp and clean.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

DETAILED DESCRIPTION OF THE PREFERRED EMBODIMENTS

Figure 1:
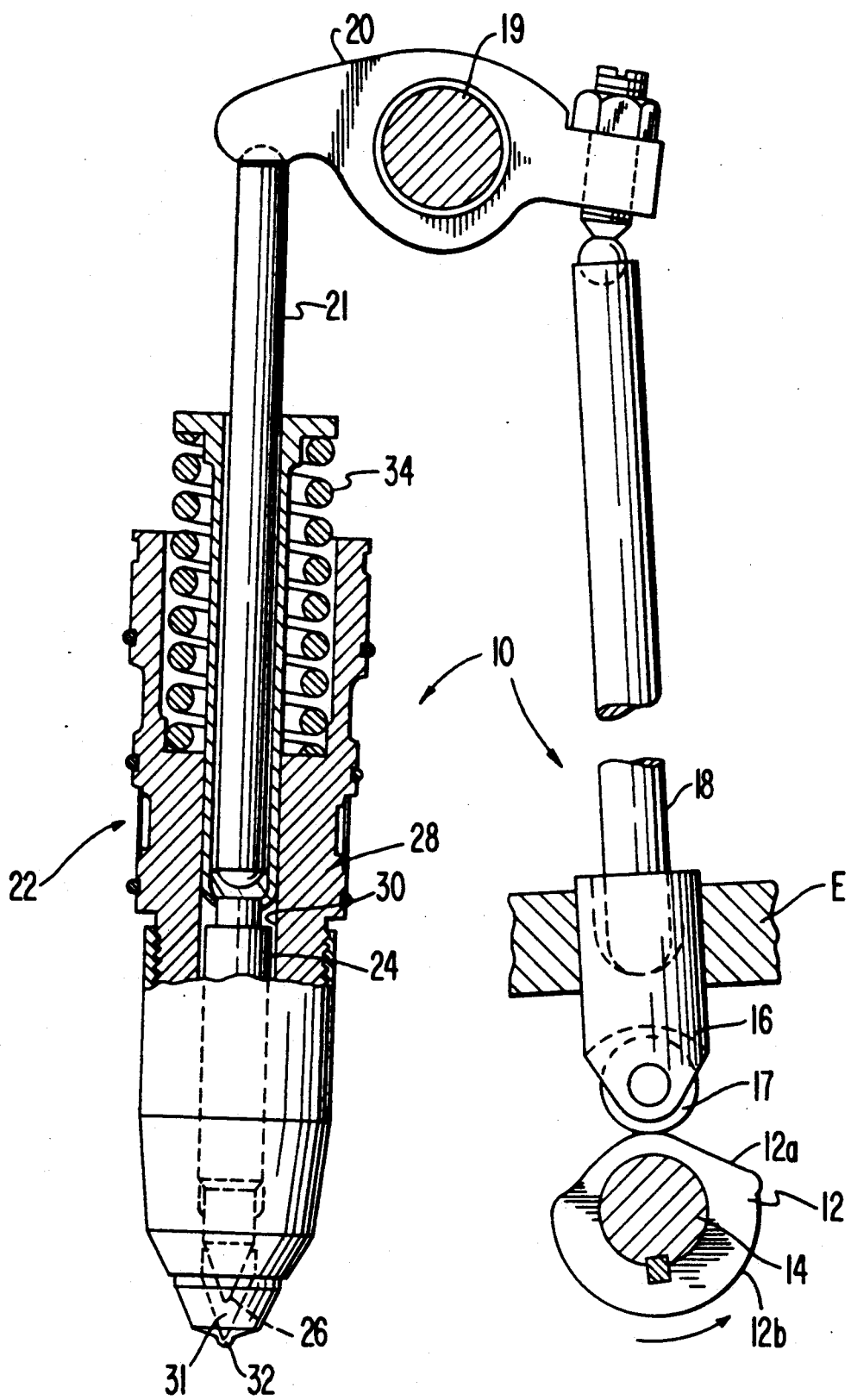
FIG. 1 is a schematic view partially in cross section of a fuel injector and drive train.

As shown generally in FIG. 1, the present invention may be used as part of a cam driven unit injector system suitable for use in internal combustion engines. Each injector encompassing the present invention can be actuated by any known fuel injector drive train with a preferred drive train shown in FIG. 1. It is understood that a typical multicylinder engine includes a unit injector and drive train for each engine cylinder.

A preferable fuel injector drive train 10 includes a cam 12 keyed to a rotatably driven cam shaft 14. The cam shaft 14 is operatively connected with the engine crank shaft in any conventional manner such as by a timing chain or direct timing gears. The cam 12 is provided with a camprofile that defines the entire injector cycle including the fuel injection as will become more apparent in the discussions below. Riding on the cam 12 i a cam follower 16 including a roller 17 rotationally mounted on the cam follower 16. The roller 17 rides on the surface of the cam 12 while the cam follower 16 is operatively mounted within the engine, usually the block, schematically illustrated at E. A push rod 18 is operatively positioned on the cam follower 16 to move reciprocably wit the cam follower 16 as the roller 17 rides over the cam 12 of cam shaft 14, and the other end of the push rod 18 abuts against a rocker arm 20 that is rotationally mounted on a shaft 21 that is fixed with respect to the engine head in a conventional manner. The rocker arm 20 further acts on a rod 21 that is used to actuate the unit fuel injector 22. It is understood that each cylinder of an internal combustion engine will have its own fuel injector 22 and each fuel injector will be associated with a drive train 10 with the cam shaft 14 including a number of cams 12 equal to the number of cylinders to actuate the drive train 10 of each fuel injector 22.

The rod 21 translates reciprocating motion from rocker arm 20 to a plunger 24 that is disposed within an axial bore 30 provided through an injector housing 28. The plunger 24 includes a plunger tip 26 disposed within a metering chamber 31 at the end of the axial bore 30 within the injector housing 28. The metering chamber 31 is open to spray fuel into a cylinder of an internal combustion engine (not shown) through injection orifices 33 at the nozzle portion 32 of the distal end of the fuel injector housing 28. A return spring 34 of an expansion coil type is provided coaxial to the plunger 24 and acts on an upper end of the plunger 24 and the injector housing 28 so as to bias the plunger 24 toward its outward most retracted position. In operation, the rod 21 translates reciprocal motion to the plunger 24 so as to define the metering chamber 31 in the retracted position of the plunger 24 and to inject fuel when the plunger 24 is moved inwardly (inwardly is defined as toward the cylinder of the internal combustion engine).

In the retracted position plunger 24 forms the injection metering chamber 31 into which fuel may be metered by pressure/time principles, as explained in U.S. Pat. Nos. 3,351,288 and 3,544,008 and incorporated herein by reference in which the amount of fuel metered is varied by controlling the supply line (common rail) pressure, the time duration of metering, and the stroke of the plunger 24. It is also contemplated that other known metering procedures can be utilized. The quantity of fuel metered into metering chamber 31 determines the amount of fuel that will be injected when plunger 24 is advanced, and the quantity is varied from a minimum amount for no load, or idle condition to a maximum amount at high load engine operating conditions. The injector nozzle 32 is positioned at the lower end of injector housing 28 and contains a plurality of the open injection orifices 33 through which fuel is forced into the combustion chamber by plunger 24 upon its advancement.

When the fuel injector 22 is driven by the drive train 10, such as described above, the fuel accumulated within the metering chamber 31 is injected into an engine cylinder by the travel of the plunger 24 moving at a rate that is primarily determined by the profile of the driving cam 12 and the inherent spring rate of the injector train 10. This inherent spring rate or degree of compliance is due to the flexing of the various elements of the injector train 10 and the play between the interconnected elements as influenced by the applied drive loads. The drive loads or forces are exerted on the one end of the drive train by the cam 12 and the opposed resistance of the fuel injector at the opposite end of the train from the fuel acting on the plunger tip 26. Thus, the movement of the plunger 24 is determined, in part, by the inherent spring rate of the injection drive train 10.

During the initial portion of the period during which fuel is injected into a cylinder of an internal combustion engine, some fuel is injected before ignition so that the fuel simply accumulates within the engine cylinder while the piston of the engine advances in its compression stroke to increase the gas pressure and temperature in the combustion chamber of the cylinder. This initial portion is defined as the preignition interval of the injection period. After the fuel is ignited, injection of fuel continues for an interval which is normally much shorter than then preignition interval, and it is understood that the injector plunger 24 continues to advance and inject fuel after ignition occurs. The injection period occurs during the time corresponding to cam portion 12a of the total injector cycle. After injection, the plunger tip 26 is seated against the end of the nozzle 32 to arrest further movement of the plunger despite further forces imparted by the cam. These further forces correspond to the overtravel portion of the cam operation, wherein cam 12 is designed to affect greater movement to the plunger 24 once the plunger tip 26 seats against the nozzle 32 by the portion 12b in a known manner. This overtravel is absorbed by a corresponding shortening of the drive train 10.

It is a specific purpose of the present invention to achieve a more clearly optimal fuel injection throughout the entire fuel injection interval of the injector cycle, i.e., the interval during which the injector plunger is advancing toward the injector nozzle. Thus, when designing unit injectors in accordance with the above described characteristics of unit injectors, it has been found to be desirable to vary the rate of fuel injection throughout the entire fuel injection interval, and it is further desirable to inject the bulk of the fuel after the start of combustion, which is preferably as high as cam hertz stress will allow. The amount of fuel injected within the first 10 degrees of crankshaft angle during the pre-injection interval is preferably maintained less than 20 $mm^3$ per stroke. These parameters have been discovered by applicant in order to reduce the amounts of unburned hydrocarbons, particulates, and nitric oxide emissions so as to generally improve emissions and noise.

The present invention controls the desired rate of fuel injection and achieves a more optimal fuel injection throughout the injection interval by providing an injection rate control device which is designed to slow the rate of fuel flow of injection during an initial phase of the injection interval and to significantly speed up the fuel flow rate during a second phase of the injection interval. Moreover, the final portion of the injection interval is devoted to a very quick shut-off of fuel flow, and the overtravel of the injection plunger ensures that the tip of the plunger will be tightly held against the nozzle portion of the injector after the injection period is complete. As a result of the rate control operation, less fuel can be injected during the early portion of the injection period, and more fuel during the latter portion, so that the shape of the pressure curve can be altered while maintaining the same area under the curve as would be obtained with a normal injection rate over the entire injection interval.

Figure 2:
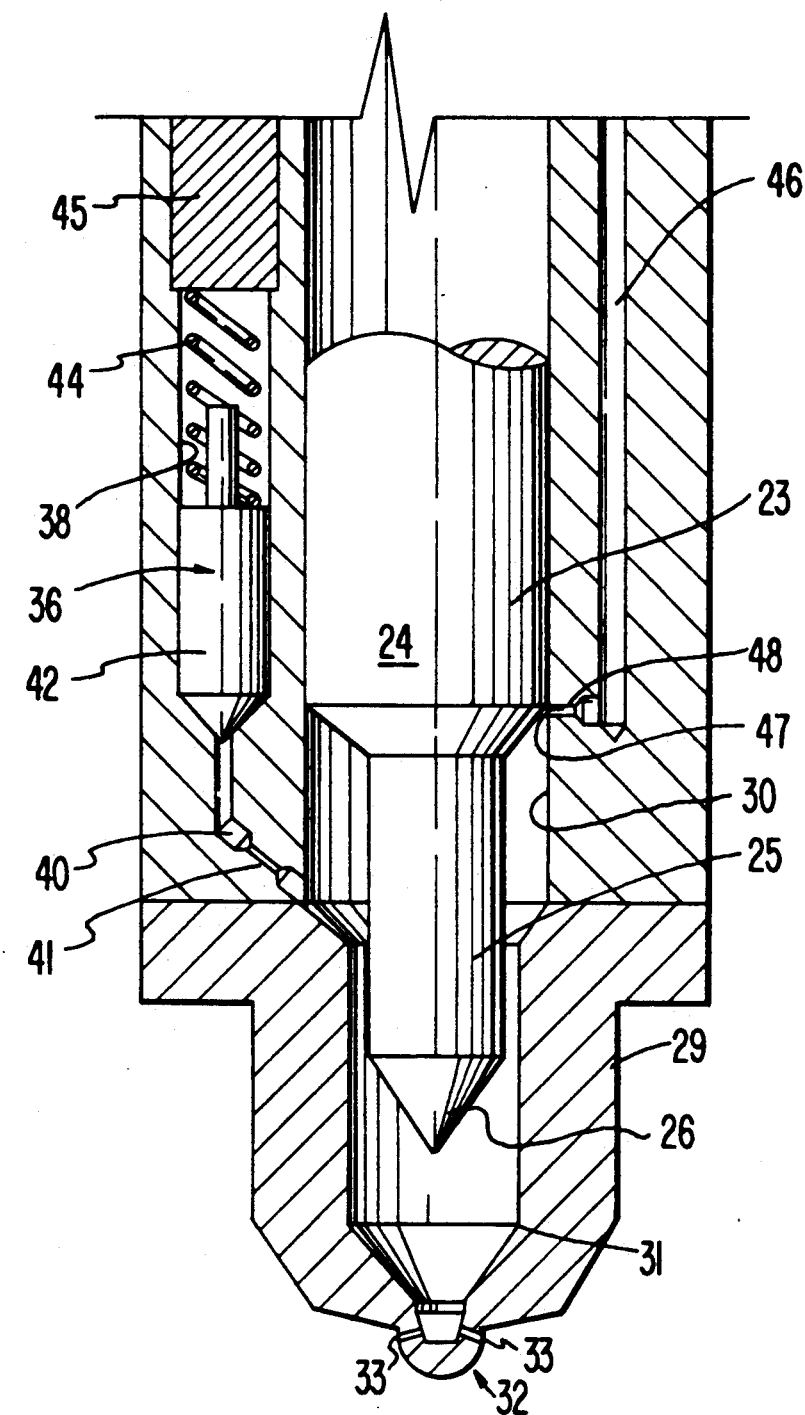
FIG. 2 is a cross sectional partial side view of a unit injector with a rate control device according to the present invention with the injector in the metering phase of operation.

In accordance with one specific embodiment of the present invention, FIG. 2 illustrates the details of a fuel injector 22 including a rate control device 36. The rate control device 36 includes an auxiliary metering chamber 38 that is connected with the main metering chamber 31 by an auxiliary passageway 40. The main metering chamber 31 is defined within the axial bore 30 within injector housing 28, nozzle cup 29, and the plunger 24 including a major diameter portion 23 and a minor diameter portion 25. Disposed within the auxiliary metering chamber 38 is an auxiliary plunger 42 and a helical expansion spring 44. The capacity of the auxiliary metering chamber 38 is preferably within the range from zero to 10 percent of the maximum fuel injection capacity of the main metering chamber 31 of the fuel injector 22.

Auxiliary passageway 40 has a restricted cross-sectional area portion 41 to control the flow of fuel therethrough an into auxiliary metering chamber 38. Auxiliary plunger 42 is disposed within auxiliary metering chamber 38 and is biased toward auxiliary passageway 40 by the helical spring 44 which has a predetermined spring rate.

Also located within the injector housing 28 is a fuel supply passageway 46 to supply fuel into the metering chamber 31 from a supply rail by way of a feed orifice 47 that opens into the axial bore 30 of housing 28. Fuel inlet passageway 46 has a restricted area portion 48 adjacent the feed orifice 47 that is used to restrict and regulate the flow of fuel therethrough in a manner similar to the restriction at 41 in auxiliary fuel passage 40. Thus, the amount of fuel entering metering chamber 31 and auxiliary passageway 40 can be controlled in accordance with fuel pressure and time principles Rate control device 36 bleeds off or diverts a portion of the fuel within metering chamber 31 to be injected from the injection orifices 33 of the nozzle 32 during a portion of the fuel injection interval of the injector cycle. In particular, the phase of the injector cycle during which fuel is diverted into the auxiliary chamber is the initial phase of the fuel injection interval and preferably includes the first ten crank angle degrees of rotation of the injection interval. Subsequently, the rate control device 36 will return the diverted fuel back to the metering chamber 31 at a later phase of the injector cycle by action of the auxiliary spring 44. In accordance with the present invention, the auxiliary spring 44 must have a spring force that is lower than the force exerted by the fuel pressure within the metering chamber 31 during the initial phase of the injection interval, wherein the fluid pressure is caused by the action of the plunger tip 26 on the fuel in the metering chamber 31 during injection. The restriction at 41 is used to control the pressure within the passageway 40 acting on the auxiliary plunger. Moreover, the spring force of spring 44 must be greater than the pressure within passageway 40 at a subsequent phase of the injector cycle operation to backflow the fuel from auxiliary chamber 38 to the metering chamber 31. Thus, the diverted fuel is cycled back to the metering chamber 31 before the next cyclic metering stage.

Figure 3:
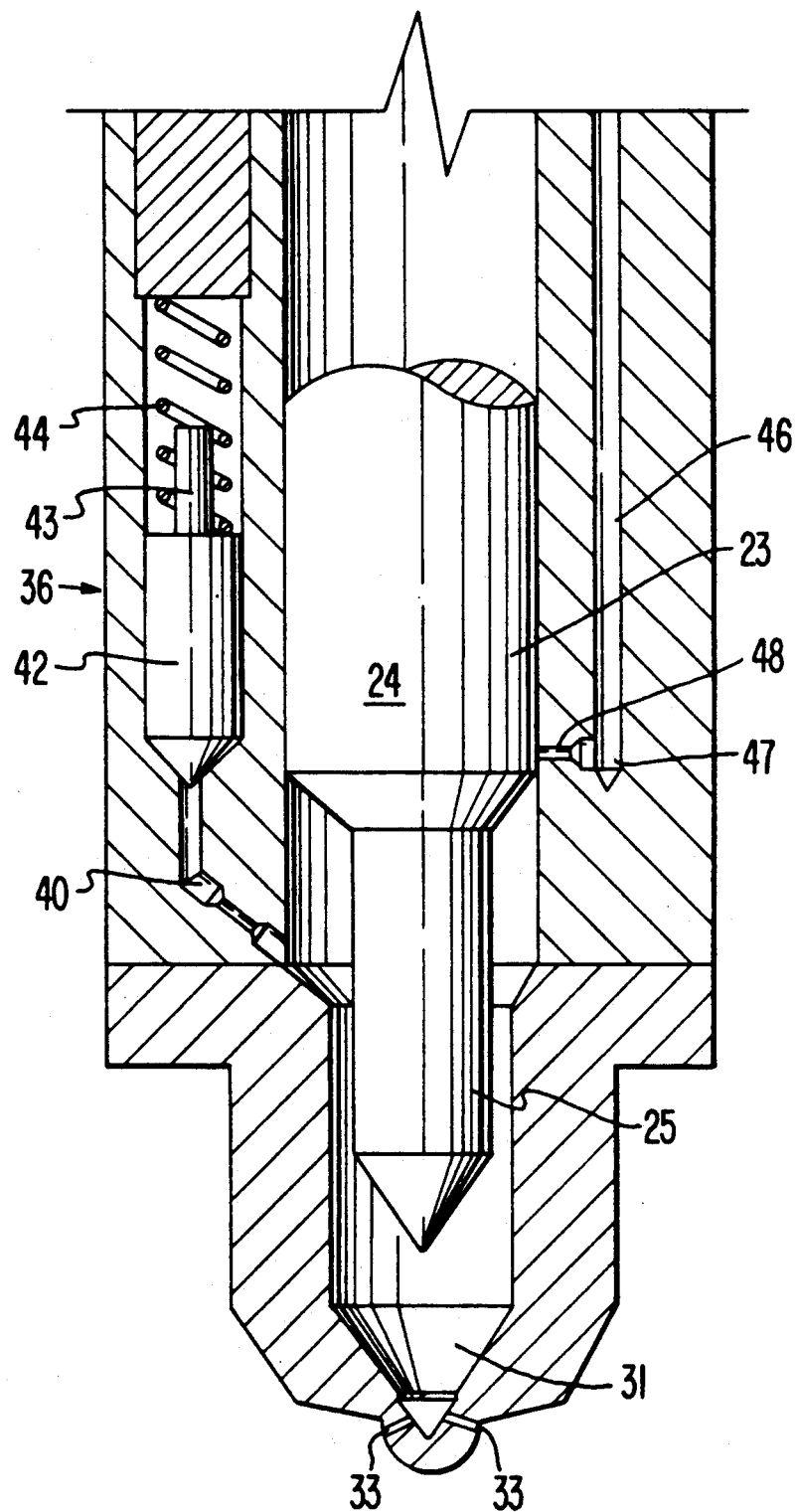
FIG. 3 is a view similar to FIG. 2 with the injector in the stack-up phase of operation.
Figure 4:
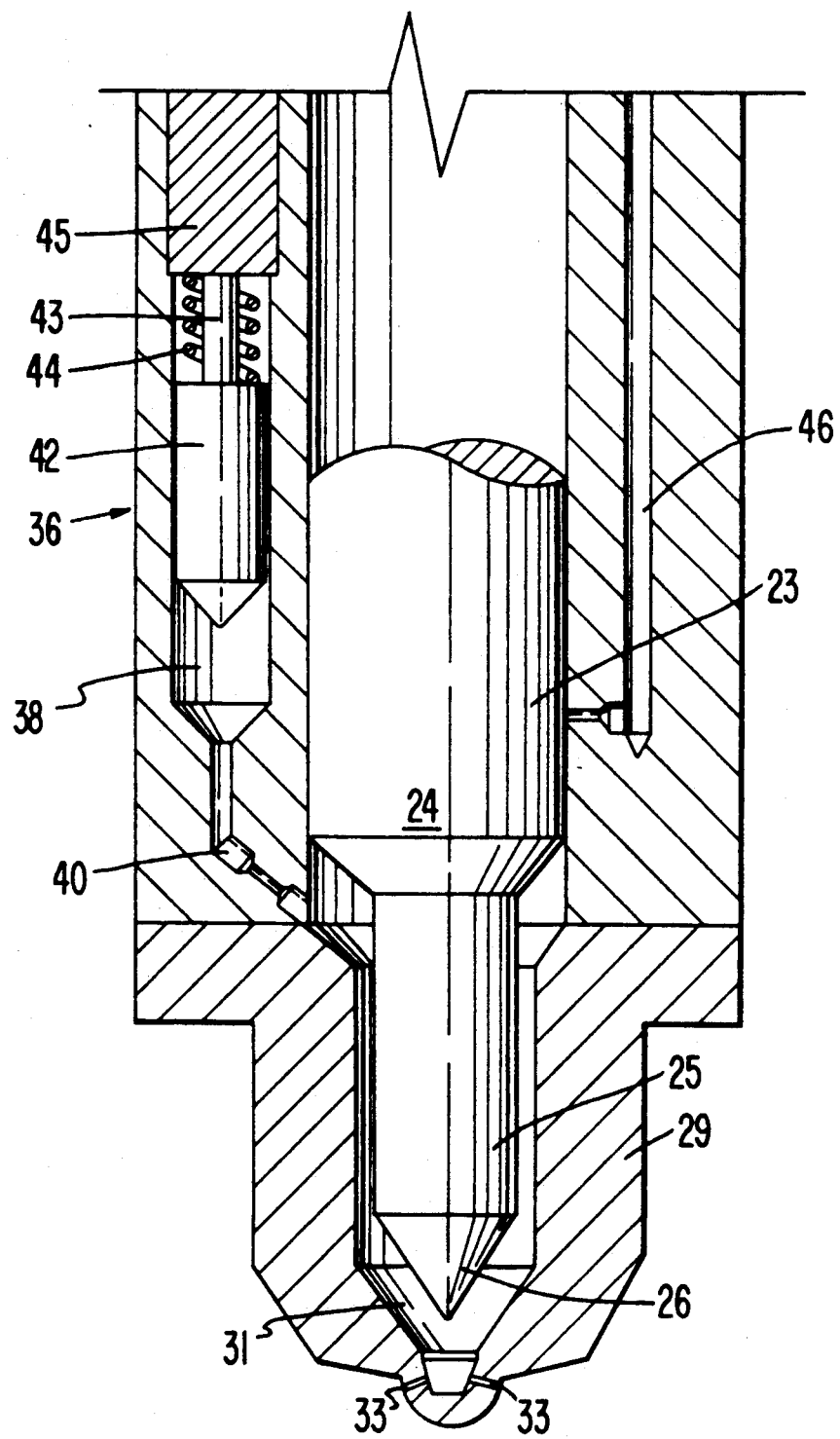
FIG. 4 is another view similar to FIGS. 2 and 3 with the injector illustrated in the fuel injection phase of the injector cycle of operation.

In operation of the above described unit fuel injector including a rate control device, reference is made to FIGS. 2, 3 and 4. The position of the plunger 24 in FIG. 2 corresponds to the position of the cam 12 and drive train 10 as shown in FIG. 1, wherein the plunger 24 is in an uppermost position before injection begins. In this position, supply fuel from supply passageway 46 enters the metering chamber 31 by way of feed orifice 47 opening into the axial bore 30. The major diameter portion 23 of the plunger 24 is located higher than the feed orifice 47 so as not to restrict the flow of fuel into the metering chamber 31. Thus, the time that the plunger 24 is in this position and the fuel pressure within passageway 46 determine the amount of fuel which is metered into the metering chamber 31 to be injected as the plunger 24 travels inward. Thus, FIG. 2 constitutes the metering phase of a unit injector operation. Moreover, during the metering phase, fuel collects in the metering chamber 31 including the lowermost portion of the axial bore 30. At the same time, the auxiliary plunger 42 is maintained in its downward most position by the auxiliary spring 44 because the pressure within auxiliary passageway 40 as controlled by restriction 41 is not sufficient to overcome the spring bias of spring 44.

Thereafter, and with reference to FIG. 3, the injector enters the stack-up phase during which the feed orifice 47 is closed off by the major diameter portion 23 of the plunger 24 and the fuel within the metering chamber 31 is forced downward within the nozzle cup 29 toward the injection orifices 33. Such being commonly referred to as stack-up. Also at this time, the fuel tends to back up within the auxiliary passageway 40, but the fluid pressure within the auxiliary passageway 40 is yet insufficient to impart movement to the auxiliary plunger 42 as biased by auxiliary spring 44. As plunger 24 continues to move downwardly the volume within the metering chamber 31 is decreased and the fluid pressure therein is increased. The fluid pressure within metering chamber 31 is increased by the plunger tip 26 until the pressure becomes sufficiently large to force the fuel through the injection orifices 33 of the injection nozzle 32 to actually begin the injection phase. However, prior to the initiation of injection, the fuel backs up into the auxiliary metering chamber 38 to slow the initial rate of injection by urging the auxiliary piston 42 upward against the bias of spring 44 to the stage illustrated in FIG. 4.

The auxiliary plunger 42 moves upwardly until a stop portion 43 thereof engages with a stop element 45 fixed with respect to the injector housing 28 as seen in FIG. 4. It is understood that the stop element 45 can be fixed to the housing 28 in any conventional manner such as by threaded engagement, wherein the stop element can be set in accordance with a desired capacity of the auxiliary chamber 38 by rotating and positioning the stop element 45. Thus, it can be seen in FIG. 4 that the capacity of the auxiliary chamber 38 to hold a quantity of diverted fuel from the metering chamber 31 is determined by the stroke length that the auxiliary plunger 42 travels within the auxiliary chamber 38. This capacity is preferably no more than 10% of the maximum capacity of the metering chamber 31.

During the diverting of fuel into the auxiliary chamber 38, fuel within metering chamber 31 is concurrently injected into an engine cylinder through the injection orifices 33. The injection continues while the plunger 24 is advanced inwardly through the completion of the injection interval of the injector cycle, and the diverted fuel within auxiliary chamber 38 is forced back into the metering chamber 31 when the pressure therein falls below the predetermined spring rate of the auxiliary spring 44 at a subsequent time in the injector cycle. Normally the backflow will occur before the next cyclic metering stage.

Thus, described above is a full injector cycle including the fuel metering stage where fuel is metered into the metering chamber 31 of the unit injector, and the injection interval where fuel is diverted into an auxiliary chamber while fuel injection occurs, and the diverted fuel is returned to the metering chamber at a subsequent phase of the injector cycle. Thus, by accurately determining the spring force necessary for auxiliary spring 44 and the size of the auxiliary plunger 42 as well as the restriction passages at 41, the injection operation can be divided into phases of a reduced rate of injection and an increased rate of injection constituting a rate control device. Moreover, it is possible to specifically reduce the injection rate during the initial phase of injection corresponding to preferably the first 10 degrees of crank angle timing, and to increase the injection rate during the following time at which it is preferable to inject fuel at the highest rate possible as determined by the cam hertz stress.

Figure 5:
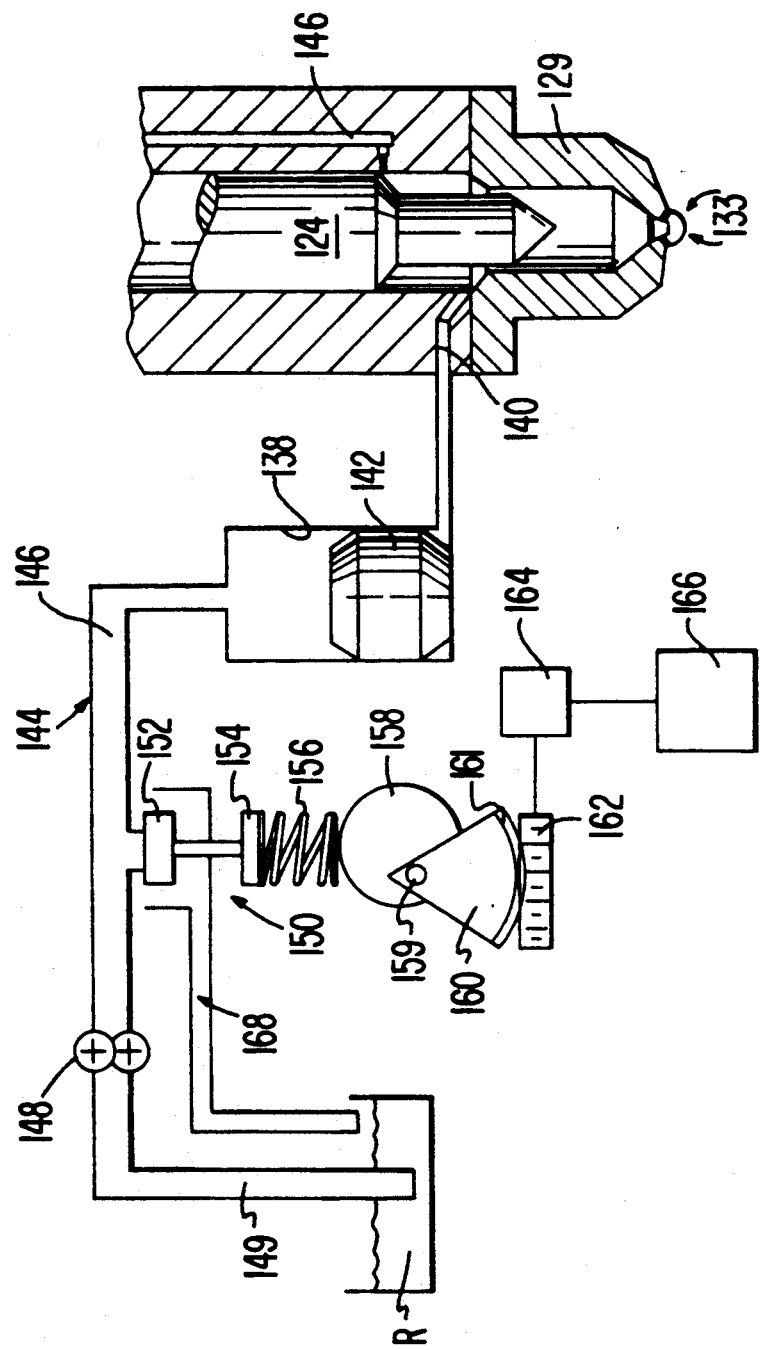
FIG. 5 is a schematic view of a fuel injector and rate control device of the present invention according to another embodiment of the invention.

A second embodiment of a rate control device formed in accordance with the present invention is illustrated in FIG. 5 and discussed below. In this embodiment, a fuel injector 122 is provided that is basically similar to the injector 22 of FIGS. 1-4 including a plunger 124, a nozzle cup 129 with injection orifices 133 and a fuel supply passageway 146. The fuel injector 122 further includes an auxiliary passageway 140, preferably including a restriction for controlling pressure (not shown). The auxiliary passageway 140 is fluidically connected with an auxiliary chamber 138 provided within the injector housing within which is disposed an auxiliary plunger or shuttle 142.

In this embodiment, a fluid biasing means 144 is provided to act against the movement of auxiliary plunger 142 as it is urged by the fuel pressure within auxiliary chamber 138 from the auxiliary passageway 140. The fluid biasing means 144 in this embodiment is comprised of a fluid spring device that supplies a control pressure in line 146 which acts against the auxiliary plunger 142 within auxiliary chamber 138 on the side opposite the auxiliary fuel passageway 140. The control pressure within line 146 is provided by a constant delivery fluid pump 148 delivering pressurized fluid from a reservoir R by way of line 149.

This control pressure can be adjustably provided without changing the pressure supplied by the fluid pump 148 by an adjustable pressure regulating means 150 including a valve element 152 that opens and closes an adjustment port 153. The valve element 152 is located against the adjustment port 153 by an extension element 154 that engages with a spring element 156 that further engages a rotatable cam 158 pivotally mounted on a shaft 159. Also fixed with the cam 158 is a toothed sector 160 so that rotational movement of the toothed sector 160 will cause the cam 158 to pivot about shaft 159. The toothed sector 160 includes teeth at 161 that engage a worm gear 162 that is conventionally associated with a drive device 164. The drive device 164 can be any conventional motor that is hydraulically or electrically driven, which preferably comprises a conventional electric stepper motor. The motor 164 is further preferably connected with a control means 166 that includes engine sensors that determine the position of the adjustable pressure regulating means 150 in accordance with engine operating parameters. Typical engine operating parameters include engine temperature, intake manifold pressure, and engine load. It is understood that any number of other engine parameters can be monitored to determine the operation of the unit injectors.

Thus, the device of the second embodiment allows the control pressure to be adjustably provided such that upon the attainment of a specified pressure as determined by the position of the cam 158 and the force applied by spring 156, the valve element 152 will open the adjustment port 153 permitting fluid spill off and the resultant decrease in control pressure which will in turn affect the force applied against auxiliary plunger 142, the stroke of the auxiliary plunger 142, the capacity of the auxiliary chamber 138 and the rate shape of the fuel injection interval. A spill over line 168 is additionally provided to receive the fluid that exits the adjustment port 153 when the valve element 152 is opened so as to recirculate the fluid into the reservoir R. The extension element 154 is of course slidably mounted through the spill over 168 by a conventional sealing arrangement.

Figure 6:
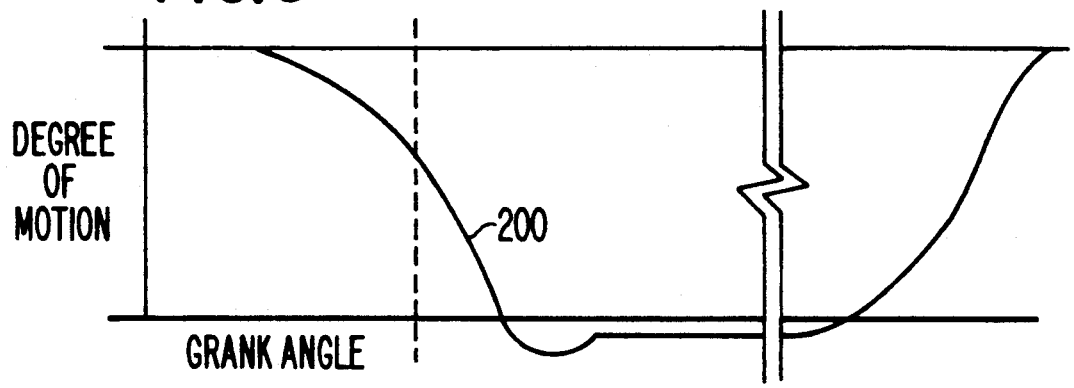
FIG. 6 is a graphical illustration of the plunger motion verses crank shaft angle of a device formed in accordance with the present invention.
Figure 7:
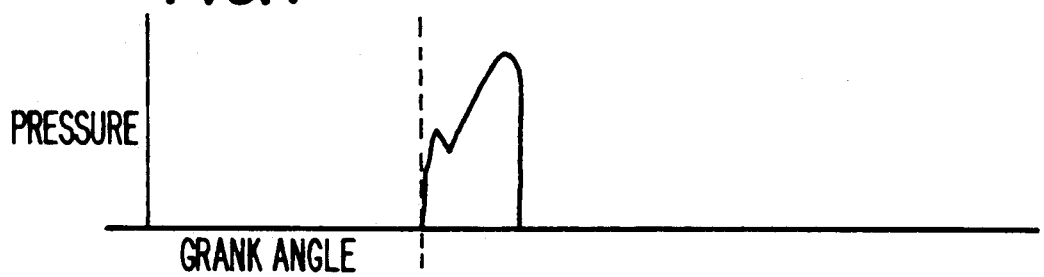
FIG. 7 is a graphical illustration of the rate shape curve plotted as a function of pressure and time for a conventional unit fuel injector without a rate control device.
Figure 8:
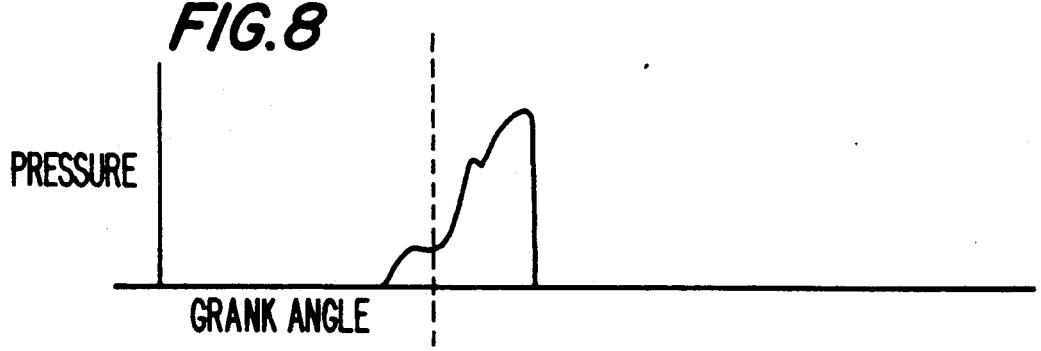
FIG. 8 is a graphical illustration of a rate shape curve as a function of pressure and time for a unit fuel injector having a rate control device formed in accordance with the present invention.

Referring now to FIGS. 6, 7 and 8, a basic operation of a fuel injector designed in accordance with the present invention will be described in comparison to a conventional injector without a rate control device. Specifically, in FIG. 6, the graph illustrates the motion of a plunger by line 200 over a period of time represented in crank angle degrees for a single injector cycle. This motion conforms to a cam and drive train configuration shown in FIG. 1, wherein the portion 12a of the cam 12 corresponds to the injection interval of the injector cycle graphed as the downward sloped portion of line 200, and the portion 12b corresponds to the horizontal portion of line 200 drawn below the horizontal line C of the graph that represents the injector cup position. The difference between the two horizontal lines represents the overtravel portion which is absorbed by the drive train by a shortening thereof. Also, the dashed line represents the starting point of the injection interval for a unit injector without a rate control device in accordance with the present invention.

FIG. 7 illustrates a fuel injection rate characteristic curve of a fuel injection system not having a rate control device. The graph compares the pressure of the fuel injected to the time duration measured by the crank angle with respect to the plunger motion illustrated in FIG. 6. As can be seen, the pressure increases quickly from the point at which the plunger contacts the fuel within the metering chamber (the vertical dashed line) after which the total fuel injection interval occurs until the pressure drops off to zero at the end of injection.

In comparison thereto, FIG. 8 illustrates the fuel injection rate characteristic curve of a unit fuel injector including a rate control device formed in accordance with the present invention. In this figure it can be seen that the area before the vertical dashed line corresponds to the rate control portion of the rate shape characteristic curve, wherein the pressure during the rate control portion of the curve is adjustable by setting the spring force or control pressure on the back side of the auxiliary plunger and the duration of the rate control portion is a function of the stroke and diameter of the auxiliary plunger (volume displaced) and the pressure setting of the control pressure.

Since during an injector cycle in accordance with the present invention, fuel is diverted into the auxiliary chamber after metering and during the fuel injection interval, the fuel diverted into the auxiliary chamber can re-enter the metering chamber of the fuel injector after the injection interval when the plunger is once again displaced outwardly and the pressure within the metering chamber is reduced below the force of the auxiliary spring. Thereafter in the next injector cycle, a quantity of fuel is metered into the metering chamber thus providing more fuel in the metering chamber than would be present without the use of the auxiliary chamber. Thus, the plunger when driven inwardly impacts the fuel in the metering chamber sooner and causes the pressure to rise earlier than it would without the use of a rate control device. This happening is clearly illustrated when comparing the FIG. 7 rate characteristic curve with the FIG. 8 rate characteristic curve. Moreover, by diverting or displacing fuel into the auxiliary chamber, fuel injection begins earlier but the amount of fuel injected is less so as to provide a reduced amount of fuel in the first phase of the fuel injection interval as amplified above and preferably within the first 10 degrees of crank angle of the injection operation. Moreover, the fuel within the auxiliary chamber is basically recycled through the metering and injecting stages such that the rate of injection of the injection interval is controlled in each subsequent injector cycle in accordance with the rate characteristic curve shown in FIG. 8.

By controlling the injection to provide a lower rate of injection at the beginning of the injection interval, the amount of fuel injected before combustion is controlled so that more fuel is injected in a second phase of the injection interval during combustion so as to reduce undesirable engine emissions including nitric oxide and unburned hydrocarbons. Moreover, by reducing the rate of pressure rise in the maximum gas pressure in the engine cylinders, the injection system provided by this invention reduces engine noise and mechanical stresses on the engine. Furthermore, by reducing the maximum gas temperature in the engine cylinders, this injection system also reduces the temperature and thermal stressing of the cylinder walls in the engine, thereby reducing the thermal load on the cooling system.

INDUSTRIAL APPLICABILITY

It is understood that the present invention is applicable to all internal combustion engines utilizing a fuel injection system. This invention is particularly applicable to diesel engines which require operation for long durations with accurate fuel injection control by a simple rate control device formed in the injector housing which can achieve the above noted advantages. Such internal combustion engines including a fuel injector system in accordance with the present invention can be widely used in all industrial fields and non-commercial applications, including trucks, passenger cars, industrial equipment, lawn mowers, compressors, stationary power plants and others.

I claim:
1. A cyclically operating unit fuel injector for controlling the rate of fuel injection in a fuel injection system of an internal combustion engine having a cam shaft for synchronously operating the unit injector, said fuel injector comprising:
an injector housing having an axial bore with an injection orifice at one end;
a plunger mounted for reciprocating movement within said axial bore of said housing and translatable between a retracted position and an advanced position in response to rotation of the camshaft to inject during each cycle of variable quantity of fuel up to a maximum quantity through said injection orifice into a combustion chamber of the engine;
plunger biasing means for biasing said plunger toward said retracted position; and
rate control means for reducing the rate of fuel injection during a first phase of the injector cycle by bleeding off a portion of the fuel to be injected from said axial bore during said first phase of the injector cycle and by returning the fuel to said axial plunger bore during a subsequent phase of the injector cycle, said rate control means comprising an auxiliary metering chamber which receives the fuel bled from said axial bore and an auxiliary passageway disposed in fluid communication between said axial bore and said auxially metering chamber to transmit fuel to and from said axial bore and said auxiliary metering chamber, said auxiliary passageway being reduced sufficiently in size to restrict the flow of fuel therethrough during the injector cycle to a desired level in order to control the bleeding off of fuel in said fist phase and the return of fuel to the axial plunger bore during said subsequent phase.
2. A fuel injector according to claim 1 wherein said rate control means is separate from said plunger and is contained within said injector housing.
3. A fuel injector according to claim 1 wherein said first phase of the injector cycle comprise the initial portion of the fuel injection interval of the injector cycle.
4. A fuel injector according to claim 3 wherein said first phase of the injector cycle comprises the first ten crank angle degrees of rotation during the fuel injection interval of the injector cycle.
5. A fuel injector according to claim 4 wherein no more than 20 mm$^3$ of fuel per strike is injected during said first ten crank angle degrees of rotation during the injector cycle.
6. A fuel injector according to claim 1 wherein said rate control means further comprises an auxiliary plunger disposed within said auxiliary metering chamber.
7. A fuel injector according to claim 6 wherein said rate control means further comprises auxiliary plunger biasing means for controlling the movement of said auxiliary plunger with the rate of flow of fuel into the metering chamber during said first phase being accurately determined by selecting the diameter of and bias on said auxiliary plunger and by further selecting the size of said auxiliary passage to reduce further the rate of flow to said desired level by reducing the rate of flow below the level which would otherwise occur as determined by the diameter of the bias on said auxiliary plunger.
8. A fuel injector according to claim 7 wherein said auxiliary plunger biasing means causes said auxiliary plunger to return the bled fuel within said auxiliary metering chamber to said axial bore when the pressure exerted on said auxiliary plunger by said auxiliary plunger biasing means exceeds the fluid pressure of the fuel acting on said auxiliary plunger in said auxiliary metering chamber.
9. A fuel injector according to claim 8 wherein said auxiliary plunger biasing means comprises a helical spring disposed within said auxiliary metering chamber.
10. A fuel injector according to claim 8 wherein said rate control means variably control the rate of fuel injection.
11. A fuel injector according to claim 1 wherein said rate control means variably control the rate of fuel injection.
12. A fuel injector according to claim 1, wherein said injector housing has a two piece construction comprising an upper housing portion and an injector cup attached thereto including said injection orifice, and said auxiliary passageway opens into said axial bore proximate the interface between said upper housing portion an injector cup.
13. A fuel injector according to claim 12, wherein said auxiliary passageway comprises a restricted cross-sectional area portion adjacent the point at which said auxiliary passageway opens into said axial bore, said restricted cross-sectional area portion being inclined downwardly toward said injector cup relative to said axial bore.
14. A cyclically operating unit fuel injector for controlling the rate of fuel injection in a fuel injection system of an internal combustion engine having a camshaft for synchronously operating the unit injector, said fuel injector comprising:
an injector housing having an axial bore with an injection orifice at one end;;
a plunger mounted for reciprocating movement within said axial bore of said housing, and translatable between a retraced position and an advanced position in response to rotation of the camshaft to inject during each cycle a variable quantity of fuel up to a maximum quantity through said injection orifice into a combustion chamber of the engine;

plunger biasing means for biasing said plunger toward said retracted position; and rate control means for reducing the rate of fuel injection during a first phase of the fuel injection interval of the injector cycle by bleeding off a portion of the fuel to be injected from said axial bore during aid fist phase and by returning the fuel to said axial bore during a subsequent phase of the injector cycle, said rate control means comprising:

an auxiliary metering chamber which receives the fuel bleed from said axial bore;

an auxiliary passageway disposed in fluid communication between said axial bore and said auxiliary metering chamber to transmit fuel to and from said axial bore and said auxiliary metering chamber, said auxiliary passageway being reduced sufficiently in size to restrict the flow of fuel therethrough during the ine tor cycle to a desired level in order to control the bleeding off of fuel in said first phase and the return of fuel to the axial plunger bore during said subsequent phase;

an auxiliary plunger disposed within said auxiliary metering chamber;

an auxiliary plunger disposed within said auxiliary metering chamber, and auxiliary plunger biasing means for controlling the movement of said auxiliary plunger;

wherein during said first phase of the fuel injection of the injector cycle the force generated by the fluid pressure of the fuel acts against one end of said auxiliary plunger and exceeds the force of said auxiliary plunger biasing means acting on another end of said auxiliary plunger, and fuel travels from said axial bore, through said auxiliary passageway, and not said auxiliary metering chamber against the force of said auxiliary plunger biasing means, and during said second phase of the injector cycle the force of said auxiliary plunger biasing means exceeds the force generated by the fluid pressure within the auxiliary chamber acting on said auxiliary plunger and the force of said auxiliary plunger biasing means move said auxiliary plunger to return the furl to said axial bore.

15. A fuel injector according to claim 14 wherein said rate control means is disposed in said injector housing.

16. A fuel injector according to claim 15 wherein said auxiliary plunger biasing means comprises a helical spring disposed within said auxiliary chamber.

17. A fuel injector according to claim 15 wherein said rate control means variably controls the rate of fuel injection.

18. A cyclically operating unit fuel injector for controlling the rate of fuel injection in a fuel injection system of an internal combustion engine having a cam shaft for synchronously operating the unit injector, said fuel injector comprising:

an injector housing having an axial bore with an injection orifice at one end;

a plunger mounted for reciprocating movement within said axial bore of said housing and translatable between a retracted position and an advanced position in response to rotation of the camshaft to inject during each cycle a variable quantity of fuel up to a maximum quantity through said injection orifice into a combustion chamber of the engine;

plunger biasing means for biasing said plunger toward said retracted position; and rate control means for reducing the rate of fuel injection during a first phase of the injector cycle by bleeding off a portion of the fuel to be injected form said axial bore during said first phase of the injector cycle and by returning the fuel to said axial plunger bore during a subsequent phase of the injector cycle, said rate control means comprising:

an auxiliary metering chamber which receives the fuel bled from said axial bore;

an auxiliary passageway disposed in fluid communication between said axial bore and said auxiliary metering chamber to transmit fuel to and from said axial bore and said auxiliary metering chamber;

an auxiliary plunger disposed within said auxiliary metering chamber; and an auxiliary plunger biasing means for controlling the movement of said auxiliary plunger, said auxiliary plunger biasing means causing said auxiliary plunger to return the bled fuel within said auxiliary metering chamber to said axial bore when the pressure exerted on said auxiliary plunger by said auxiliary plunger biasing means exceeds the fluid pressure of the fuel acting on said auxiliary plunger in said auxiliary metering chamber, said auxiliary plunger biasing means comprising a fluid biasing system including a fluid reservoir, a fluid pump means for delivering pressurized control fluid from said fluid reservoir, and a conduit between said fluid pump means and said auxiliary metering chamber to supply the pressurized control fluid to act on said auxiliary plunger on the end thereof opposite to the end exposed to fuel from said auxiliary passageway, whereby said rate control means variably controls the rate of fuel injection.

19. A fuel injector according to claim 18 wherein said auxiliary plunger biasing means further includes an adjustable pressure regulating means or adjustably controlling the pressure of the pressurized control fluid and the auxiliary plunger biasing means so as to variably control the rate of fuel injection.

20. A fuel injector according to claim 19 wherein said rate control means further includes control means for automatically adjusting the pressure regulating means in response to engine operation parameters.

21. A cyclically operating unit fuel injector for controlling the rate of fuel injection in a fuel injection system of an internal combustion engine having a camshaft of synchronously operating the unit injector, said fuel injector comprising:

an injector housing having an axial bore with an injection orifice at one end;

a plunger mounted for reciprocating movement within said axial bore of said housing, and translatable between a retracted position and an advanced position in response to rotation of the camshaft to inject during each cycle a variable quantity of fuel up to a maximum quantity through said injection orifice into a combustion chamber of the engine;

plunger biasing means for biasing said plunger toward said retracted position; and rate control means disposed in said injector housing for reducing the rate of fuel injection during a first phase of the fuel injection interval of the injector cycle by bleeding off a portion of the fuel to be injected from said axial bore during said first phase and by returning the fuel to said axial bore during a subsequent phase of the injector cycle, said rate control means comprising an auxiliary metering chamber which receives the fuel bled from said axial bore, an auxiliary passageway disposed in fluid communication between said axial bore and said auxiliary metering chamber to transmit fuel to and from said axial bore and said auxiliary metering chamber, an auxiliary plunger disposed within said auxiliary metering chamber, and auxiliary plunger biasing means for controlling the movement of said auxiliary plunger;

wherein during said first phase of the fuel injection of the injector cycle the force generated by the fluid pressure of the fuel acts against one end of said auxiliary plunger and exceed s the force of said auxiliary plunger biasing means acting on another end of said auxiliary plunger, and fuel travels from said axial bore, through said auxiliary passageway, and into said auxiliary metering chamber against the force of said auxiliary plunger biasing means, and during said second phase of the injector cycle the force of said auxiliary lunger biasing means exceeds the force generated by the fluid pressure within the auxiliary chamber acting on said auxiliary plunger and the force of said auxiliary plunger biasing means moves said auxiliary plunger to return the fuel to said axial bore: and wherein said rate control means variably controls the rate of fuel injection and said auxiliary plunger biasing means comprises a fluid biasing system including a fluid reservoir, a fluid pump means for delivery of pressurized control fluid from said fluid reservoir, and a conduit between said fluid pump means and said auxiliary metering chamber to supply the pressurized control fluid to act on said auxiliary plunger on the end thereof opposite to the end exposed to fuel from said auxiliary passageway.

22. A fuel injector according to claim 21 wherein said auxiliary plunger biasing means further includes an adjustable pressure regulating means for adjustably controlling the pressure of the pressurized control fluid and the auxiliary -lunger biasing means so as to variably control the rate of fuel injection.

23. A fuel injector according to claim 22 wherein said rate control means further includes control means for automatically adjusting the pressure regulating means in response to engine operation parameters.

* * * * *